Dec. 22, 1953  F. KOSTKA  2,663,556
DEVICE FOR SELECTIVELY DISPENSING
ORDINARY AND CARBONATED WATER
Filed May 29, 1950
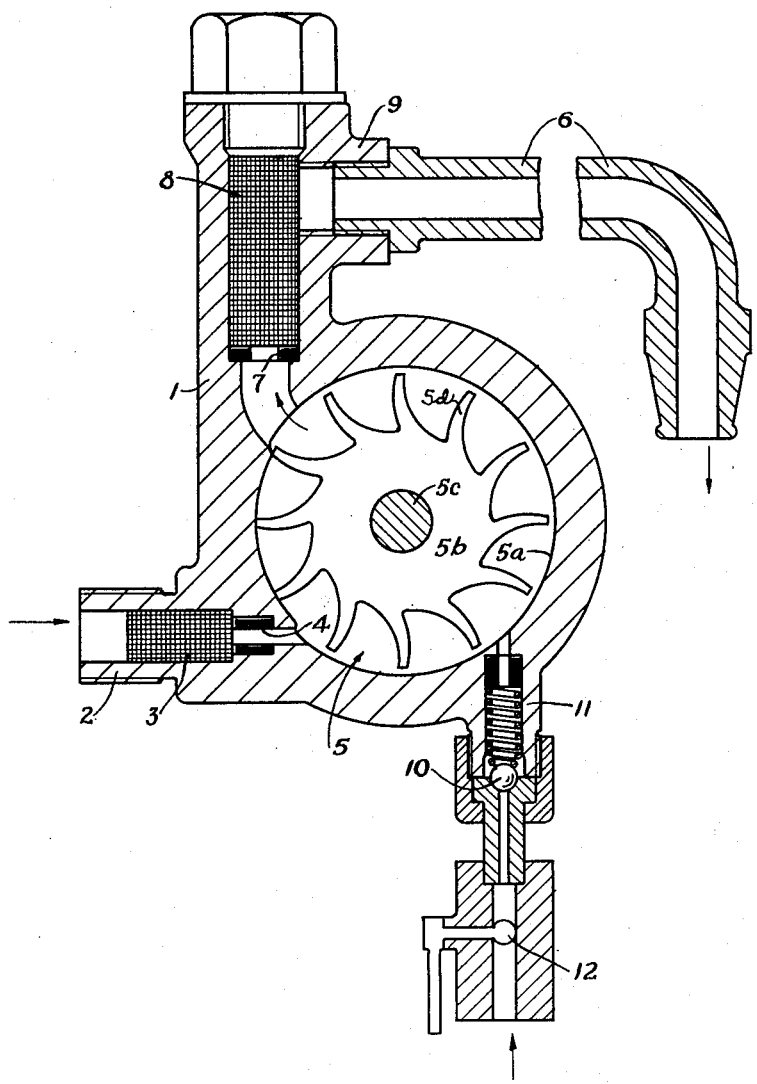
INVENTOR.
FRANZ KOSTKA
BY
Mock & Blum
ATTORNEYS Patented Dec. 22, 1953

2,663,556

UNITED STATES PATENT OFFICE 2,663,556

DEVICE FOR SELECTIVELY DISPENSING ORDINARY AND CARBONATED WATER

Franz Kostka, Vienna, Austria

Application May 29, 1950, Serial No. 164,881

2 Claims. (Cl. 261—64)

This invention relates to a device for selectively dispensing drinking or utility water from any existing mains tapping.

The essential feature of this invention consists in that a turbine-type, horizontal-axis, water-and-gas mixer is provided, which can be connected to the water main, and in which the mixing motion is accelerated by the simultaneous action of the water and of the carbonic acid in the same effective sense, when the discharge cock and the carbonic acid shut-off valve have been opened for the dispensing of carbonated water, so that the water is saturated with carbonic acid and is dispensed as high-quality carbonated water through the discharge cock.

The accompanying drawing is a longitudinal section showing an embodiment of the invention by way of example.

The device comprises a head 1, preferably made from a copper-zinc alloy or from a suitable light alloy, with a branch 2 for connection to the existing water mains with the conventional threads. In case of an unconventional thread, the same may also be cut on the branch. The mains water flows in this branch through a filter 3 and a nozzle 4, which is selected according to the water pressure prevailing, into the mixer 5. When ordinary drinking or utility water is to be dispensed out of the mains, this mixer is caused to vibrate, to rotate, or to perform any other motion, when the discharge cock 6 has been opened so that after passing through the mixer the water enters through a replaceable member having a diaphragm opening 7, which is selected according to the local water pressure, a filter 8, and the discharge branch 9, into the discharge cock through which it is discharged.

In the preferred embodiment, shown in the drawing, said mixer 5 comprises a substantially cylindrical casing 5a having an axial shaft 5c turnably mounted therein. Rotor 5b is fixed to shaft 5c and extends substantially the length of chamber 5a. Rotor 5b is substantially disc-shaped in cross section and has a plurality of fingers 5d extending laterally outwardly from the periphery thereof. Each said finger 5d extends substantially the length of chamber 5a and has its free or outer edge slightly spaced from the peripheral wall of chamber 5a. Said fingers 5d are circumferentially spaced around the periphery of rotor 5b and are curved in such a way as to facilitate the turning of rotor 5b as a result of the flow of water into chamber 5a from nozzle 4. When carbonated water is being dispensed, the motion of the mixer is accelerated by the admission of carbonic acid through the self-acting valve 10 in the same effecting direction as the water jet.

The carbonic acid is admitted into chamber 5a from a suitable source (not shown) through manual shut-off valve 12, said valve 10, and admission branch 11.

Being saturated with carbonic acid, the water, which now constitutes high-quality carbonated water, flows along the same path as the drinking or utility water; mixer 5, diaphragm opening 7, filter 8, discharge branch 9, and discharge cock 6. Shut-off valve 12 is adapted to be manually opened when carbonated water is to be dispensed and remains closed during the dispensing of drinking or utility water. The aforementioned self-acting valve 10, owing to spring pressure and to its own weight, remains closed when the device is inoperative or is dispensing drinking or utility water. The valve is opened by the pressure of the carbonic acid when carbonated water is being dispensed.

The height of the device without the cock is approximately 140 mm., the width 50 mm., and the dimension from the connection thread to the most widely overhanging point 80 mm. These dimensions may even be reduced.

It will be noted that in order to provide the maximum efficiency in the mixing operation, the ends of the blades of the mixer or turbine wheel 5 are proximate to the cylindrical wall of the casing in which said mixer 5 is located.

It will be noted that water enters chamber 5a through a first inlet pipe, and carbonic acid enters chamber 5a through a second inlet pipe, the mixed water and carbonic acid leaving chamber 5a through an outlet pipe. Preferably, the axes of said inlet pipes respectively extend substantially tangentially to the direction of rotation of rotor 5b. Preferably, the second inlet pipe enters chamber 5a at a point approximately 90 degrees from the point of entry of the first inlet pipe, as taken in the direction of rotation of rotor 5b, and the outlet pipe enters the side of chamber 5a at a point spaced from the first and second inlet pipes as taken in the sense of rotation of rotor 5b. Optionally, the two inlet pipes and the outlet pipe are in a common plane which is transverse to the axis of shaft 5c.

What I claim is:

1. A device for selectively dispensing ordinary and carbonated water, said device comprising a casing which has a chamber which has opposed end walls and a cylindrical side wall, a turbine wheel which has a hub, said hub being turnably mounted within said chamber in axial alignment therewith, said turbine wheel also having a plurality of blades mounted on said hub and extending radially outwardly therefrom, the ends of blades of said wheel being proximate to said side wall and the end faces of said wheel being respectively proximate to said end walls, a first inlet pipe which enters the side of said chamber and which is adapted to be connected to a water tap, the axis of said first inlet pipe extending substantially tangentially to the direction of rotation of said turbine wheel, and a second inlet pipe which enters the side of said chamber at a point substantially spaced from the point of entry of the first inlet pipe, as taken in the direction of rotation of said turbine wheel, the axis of said second inlet pipe also extending substantially tangentially to the direction of turning of said turbine wheel, said second inlet pipe being adapted to be connected to a source of carbon dioxide, manual means for closing off said second inlet pipe, and an outlet pipe which enters the side of said chamber at a point substantially spaced from said first and second inlet pipes as taken in the sense of rotation of said turbine wheel, whereby the streams of water and gas respectively entering said chamber through said respective first and second inlet pipes are directed in the same turning direction against the blades of said wheel whereby to produce a mixture which is ejected from said chamber through said outlet pipe.

2. A device in accordance with claim 1, said turbine wheel having a horizontal axis of rotation, said inlet pipes and said outlet pipe being located in a common plane perpendicular to the axis of the wheel, the two pipes extending in different directions in said plane and being directly joined by casting to said casing.

FRANZ KOSTKA.

References Cited in the file of this patent

UNITED STATES PATENTS

| Number | Name | Date |
|--------|------|------|
| 490,525 | Werner | Jan. 24, 1893 |
| 918,567 | Marek | Apr. 20, 1909 |
| 1,432,592 | Catini | Oct. 17, 1922 |
| 1,436,886 | Leibing | Nov. 28, 1922 |
| 1,865,991 | Winkler | July 5, 1932 |
| 2,452,260 | Peebles | Oct. 26, 1948 |